(No Model.) 8 Sheets—Sheet 1.

H. POTTIN.
CASH REGISTER.

No. 573,699. Patented Dec. 22, 1896.

Fig. 1.

WITNESSES
INVENTOR

Fig. 2.

(No Model.) 8 Sheets—Sheet 3.

H. POTTIN.
CASH REGISTER.

No. 573,699. Patented Dec. 22, 1896.

Fig. 3.

WITNESSES

INVENTOR
Henry Pottin
by
Wm H Babcock
Attorney

Fig. 4.

(No Model.) 8 Sheets—Sheet 5.

H. POTTIN.
CASH REGISTER.

No. 573,699. Patented Dec. 22, 1896.

Witnesses.
G. M. Lamasure
C. D. Davis

Inventor.
Henry Pottin
by Wm H Babcock
Attorney

(No Model.)  8 Sheets—Sheet 6.

H. POTTIN.
CASH REGISTER.

No. 573,699. Patented Dec. 22, 1896.

Witnesses.
G. M. Lamasure
C. D. Davis

Inventor
Henry Pottin
By Wm H Babcock
Attorney (No Model.) 8 Sheets—Sheet 7.

H. POTTIN.
CASH REGISTER.

No. 573,699. Patented Dec. 22, 1896.

Witnesses.
G. M. Samasure
C. D. Davis

Inventor
Henry Pottin
by W. H. Babcock
Attorney

THE NORRIS PETERS CO., PHOTO-LITHO., WASHINGTON, D. C.

(No Model.) 8 Sheets—Sheet 8.

H. POTTIN.
CASH REGISTER.

No. 573,699. Patented Dec. 22, 1896.

Witnesses.
G. M. Lamasure
C. D. Davis

Inventor
Henry Pottin
by Wm H Babcock
Attorney

THE NORRIS PETERS CO., PHOTO-LITHO., WASHINGTON, D. C.

UNITED STATES PATENT OFFICE.

HENRY POTTIN, OF PARIS, FRANCE.

CASH-REGISTER.

SPECIFICATION forming part of Letters Patent No. 573,699, dated December 22, 1896.

Application filed November 7, 1893. Serial No. 490,298. (No model.) Patented in France May 3, 1893, No. 229,817, and in Germany September 17, 1893, No. 79,603.

*To all whom it may concern:*

Be it known that I, HENRY POTTIN, civil engineer, of 43 Rue St. Georges, Paris, in the Republic of France, have invented a new Cash-Register, (for which I have obtained Letters Patent of France for fifteen years, No. 229,817, dated May 3, 1893, and also Letters Patent of Germany, No. 79,603, dated September 17, 1893;) and I do hereby declare that the following is a full and exact description thereof, reference being made to the accompanying drawings.

The object of this invention is to increase the accuracy and insure the satisfactory operation of cash-registering mechanism.

To this end the said invention consists in certain improvements in the totalizer and devices connected therewith, in the construction and combination of the mechanism for exhibiting the indicating devices and returning them to their original position, and in divers details of construction and combination hereinafter more particularly set forth and claimed.

In the accompanying drawings,
Fig. 2 represents a plan view of the same, the casing being horizontally sectioned for the same purpose.

A designates the casing, which has an inclined upper front part $a$, as usual, to serve as a desk for the cashier. This is provided with guide-slots $a^2$, Fig. 5, for the ordinary sliding keys or pusher-buttons $b$, which are attached, respectively, to rack-bars $c$, arranged in parallel series just under the inclined part $a$ of the casing. These rack-bars respectively engage and turn the toothed disks $f$, Figs. 1, 2, 3, 4, and 6, which are mounted loosely in corresponding series on a fixed shaft or rod $g$. Segments $h$ are attached to and turn with the said disks, respectively, each segment having its outer face divided into ten equal parts, numbered from "0" to "9" and arranged so that any one of the said numbers may be seen through a window $i$, Fig. 5, in the said inclined part $a$ of the casing A. These windows $i$ alternate in position with the guide-slots $a^2$ and are equal in number to the same. The cashier on receiving a sum of money slides down the pusher-buttons in their slots and stops each when the right figure appears at its window to indicate the sum received. On the said shaft $g$ are also mounted loosely a series of indicating-segments $k$, each of which is connected to one of the said disks by a bent bar or rod $l$, the first disk on the left being thus connected to the first segment $k$ on the right, the second disk on the left to the second segment on the right, and so on. Where the bars or rods $l$ must pass through intervening disks, the latter are provided with arc-shaped slots $m$, which allow the said disks and bars to move independently about said shaft without obstructive contact. The bar or rod $l$, connecting the innermost disk $f$ and segment $k$, of course does not pass through any disk.

The above system of connection, Figs. 1, 2, 3, and 9, insures the exhibition, by segments $k$ through the window $j$ in the customer's side of the casing, of the same figures which simultaneously appear through windows $i$ on the cashier's side, as stated, the corresponding segments $h$ and $k$ being similarly graduated.

The disks $f$ are each provided with three sets of teeth $e$, $n$, and $n'$, of different size and shape and occupying distinct parts of the periphery. The teeth $e$ engage the racks or rack-bars $c$. The teeth $n$ engage, respectively, gear-wheels $o$, arranged in corresponding series, when the latter are shifted into position therefor. The teeth $n'$ are used, in connection with a stopping or checking roller, for holding the said disk motionless in each instance, as required. The mechanism for operating the said roller to move it into or out of such locking engagement will be hereinafter described.

All the mechanism is driven by a springdrum $H^2$, integral with a toothed gear-wheel $H'$, loose on a shaft K, which shaft turns in fixed bearings, one of the ends of the coiled spring of the said drum, which is the main-spring or driving-spring, being attached to the latter, while the other end is attached to the said shaft. The said wheel H' meshes with an idle-wheel I, loosely mounted on an arbor I' and in gear with another cog-wheel J, fast on the main shaft A'.

The shaft K carries a lantern-wheel or stud-plate H, arranged to be engaged from below by a pawl $x^7$, which has a fixed pivot $x^8$ and a pressure-spring $x^9$, also from above by two pawls $x^4 x^5$, which are curved and pivoted like calipers on a lateral stud $x^3$ of the manipulating-lever $x$, fast on a shaft X, which is mounted in fixed bearings. This shaft X carries an arm having two forks $x' x^2$, which are provided with sticking-pieces screw-threaded for adjustment. The two dogs or pawls $x^4 x^5$ are drawn toward each other by a spring $x^6$. They are arranged and shaped to act on the studs or pins of wheel H on opposite sides of the center thereof, the pawl $x^4$ by lifting, the pawl $x^5$ by pushing down, so that their action, though alternate, produces a rotation of the wheel H and winding-shaft K always in the same direction, with a step-by-step movement, the pawl $x^7$ acting merely as a retaining device.

Figure 4:
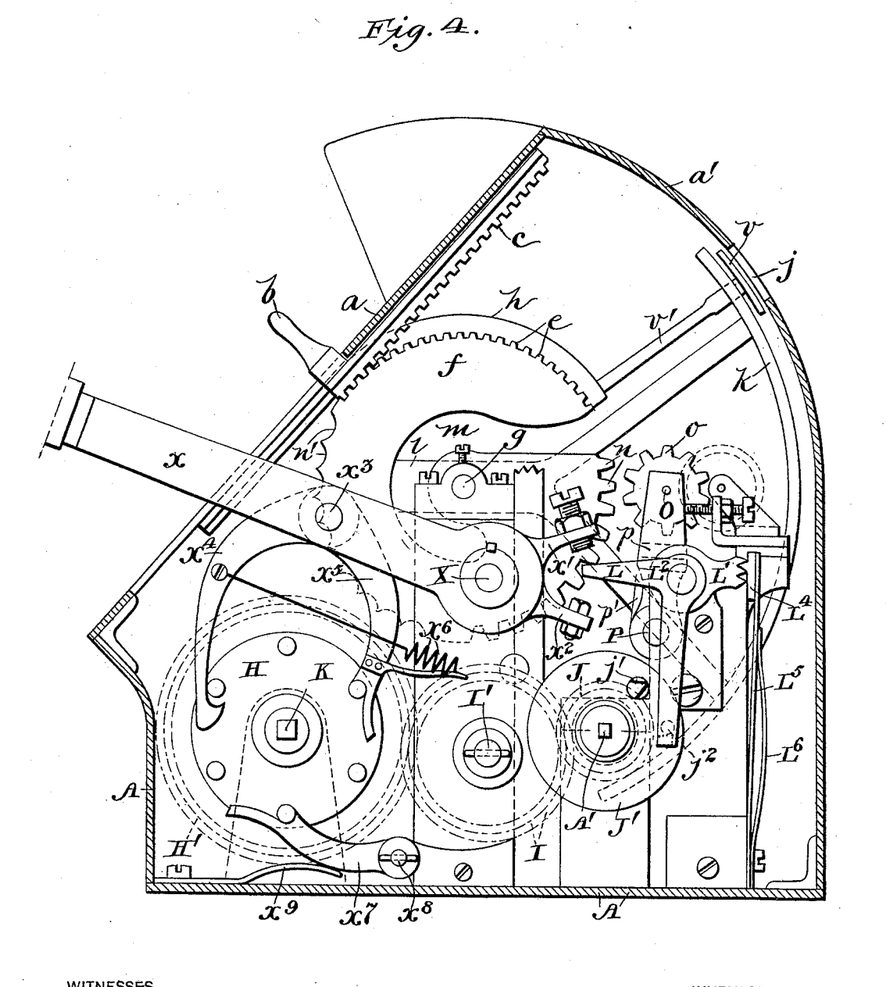
Figure 11:
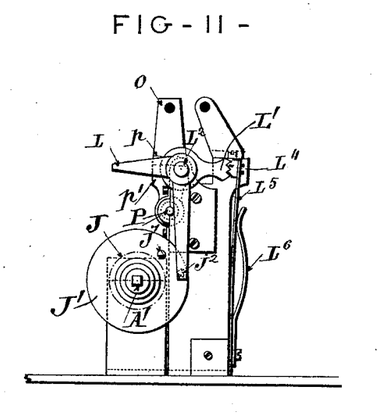

The main shaft A' has a disk J' fast on it, the said disk being provided with two lateral studs $j'$ and $j^2$ at unequal distances from its center, which alternately strike the long vertical arm of a bell-crank stop-lever L, turning on a shaft $L^2$, Figs. 4 and 11, and having rigid with it a supplemental arm L', which extends in the reverse direction from the main horizontal arm of the said lever and has two notches in its end for the engagement of a locking-spur $L^4$, which serves, by engaging with one or the other of the said notches, to lock the said bell-crank lever in either one of two positions. This spur is on a flexible blade $L^5$, fastened to a fixed attachment of the casing, and is pressed into such engagement by a spring $L^6$, as shown in Fig. 4.

When the manipulating-lever $x$, which extends outward through a slot in the casing, is drawn down by the cashier's hand, it causes the dog $x^5$ to turn the lantern-wheel or stud-plate H and the shaft K, thereby winding to some extent the spring of the drum $H^2$. The lower fork or tine $x^2$ of the forked arm aforesaid then lifts the horizontal arm of the lever L, thus withdrawing the vertical arm thereof from the outer stud $j^2$ of the disk J' and tilting it into position to be struck by the inner stud $j'$ when the latter comes around. The spur $L^4$ at once slips into the upper notch of the arm L', and thus holds the bell-crank lever in this tilted position. The spring-drum and driving-shaft then turn from left to right until the inner stud or stop $j'$ comes in contact with the long arm of the bell-crank lever L, that is to say, through somewhat less than a fourth of a rotation, as shown, when such rotation is checked again by the said stud. When the lever $x$ is raised, substantially the same operation is repeated, except that the lifting-pawl $x^4$ gives the initial movement for the winding, and the upper fork or tine $x'$ of the forked arm acts on the horizontal arm of the bell-crank lever L to depress the said horizontal arm and move the vertical arm of the said lever out of contact with stud $j'$ and into the line of revolution of the outer stud $j^2$, so as to block the latter when a little more than three-fourths of a revolution brings it around. Thus the downward and upward movements of the manipulating-lever $x$ wind and drive the mechanism at suitable intervals, depending on the work to be done, as hereinafter explained. The main shaft A' carries also eight cams F, $P^2$, Q, R, S, $T^3$, $Y^2$, and Z and a worm-wheel $V^3$ for actuating different trains of mechanism.

Figure 17:
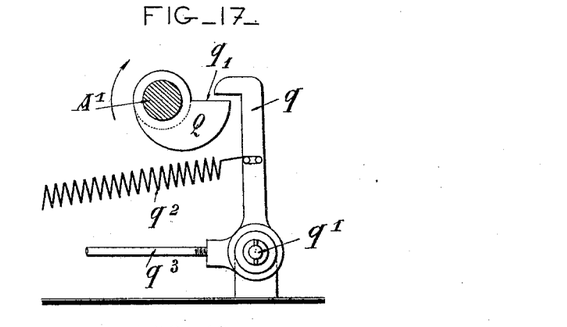

The cam Q, Fig. 17, is formed with an abrupt shoulder and acts on a bell-crank lever $q$, which is pivoted at $q'$, provided with a hammer-arm $q^3$, carrying a hammer $q^4$. When the tail of the said lever is left by the cam as the said shoulder passes from under it, a spring $q^2$, connected to the said lever, snaps down the said tail of the lever and strikes the hammer $q^4$ against a bell $q^5$.

The cam R is for the purpose of periodically locking the registering-disks $f$ before mentioned. To this end it acts on an anti-friction-roller $r'$ on an arm $r$ of a shaft B, turning in fixed bearings, Fig. 2. Shaft B carries also arms $r^2$, provided with terminal lateral spurs $r^3$, which are caused by said cam to strike against levers $r^4$, loose on the said shaft. These levers $r^4$ carry trundle-rollers $r^5$, each of which is adapted to fit in between two of the teeth $n'$ of the disks $f$. There is an arm $r^2$ and a lever $r^4$ for each disk $f$. Each lever $r^4$ is acted on by a spring $r^6$, which keeps the trundle-roller $r^5$ thereof in contact lightly with the said teeth $n'$. The action of the said cam R, through the above positive devices, is to jam the set of trundle-rollers into the respective series of teeth $n'$, each roller entering between two of the said teeth, and thereby to lock all the disks until the action of the said cam ceases. By these devices the registering-machine will hold the said disks and the indicating-segments connected thereto in the position given them by the rack-bars until it is time to return them to their first position.

Figures 5, 6, 7, 8:
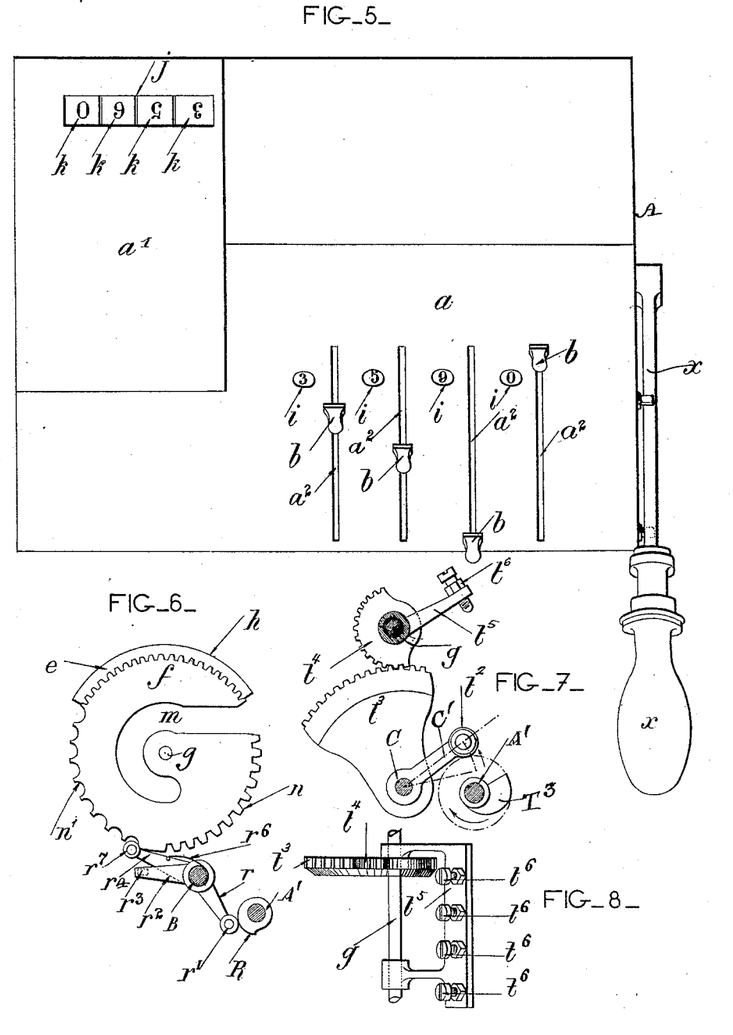
Fig. 5 represents an exterior plan view.
Figs. 6 to 20 represent detail views of various parts of the mechanism.
Figure 9:
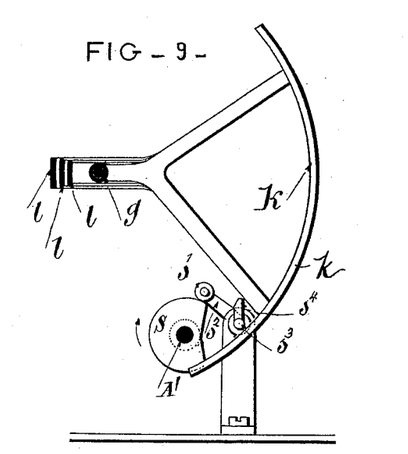

The cam $T^3$, Fig. 7, is for the purpose of returning the disks $f$ and indicating-segments $h$ $k$ to their first position. The said cam acts on a trundle-roll $t^2$, carried by an arm C' of a shaft C, journaled in fixed bearings. Shaft C carries also a toothed segment $t^3$, gearing with a similar segment $t^4$, loosely mounted on the said shaft $g$ of the registering disks and segments. This segment $t^4$ carries a lateral arm $t^5$, provided with four tappets $t^6$, Fig. 8, screwed adjustably to the said arm, one for each registering-segment $k$, the said tappets being respectively arranged to strike the supporting-arms of the said segments and return the latter to their first position under the impulse of the said cam $T^3$. By reason of the connections made by rods or bars $l$ the same operation returns the disks $f$ and segments $h$ simultaneously and in like manner to their first position. The registering mechanism is then all ready to register another payment. The roll $t^2$ remains in its raised position until lowered by the action of the corresponding rack on the wheel $f$ meshing therewith in indicating a payment. Thus through the medium of its corresponding segment $k$, arm $t^5$, and segments $t^4$ $t^3$ arm $C'$ will restore said roll into position to be lifted by the cam $T^3$ again. If the payment is not such as to require the registering operation of this particular disk and segment, of course the said roll will remain unaffected by the rotation of cam $T^3$ during the replacing operation, and will be above and out of reach of the said cam.

Figure 3:
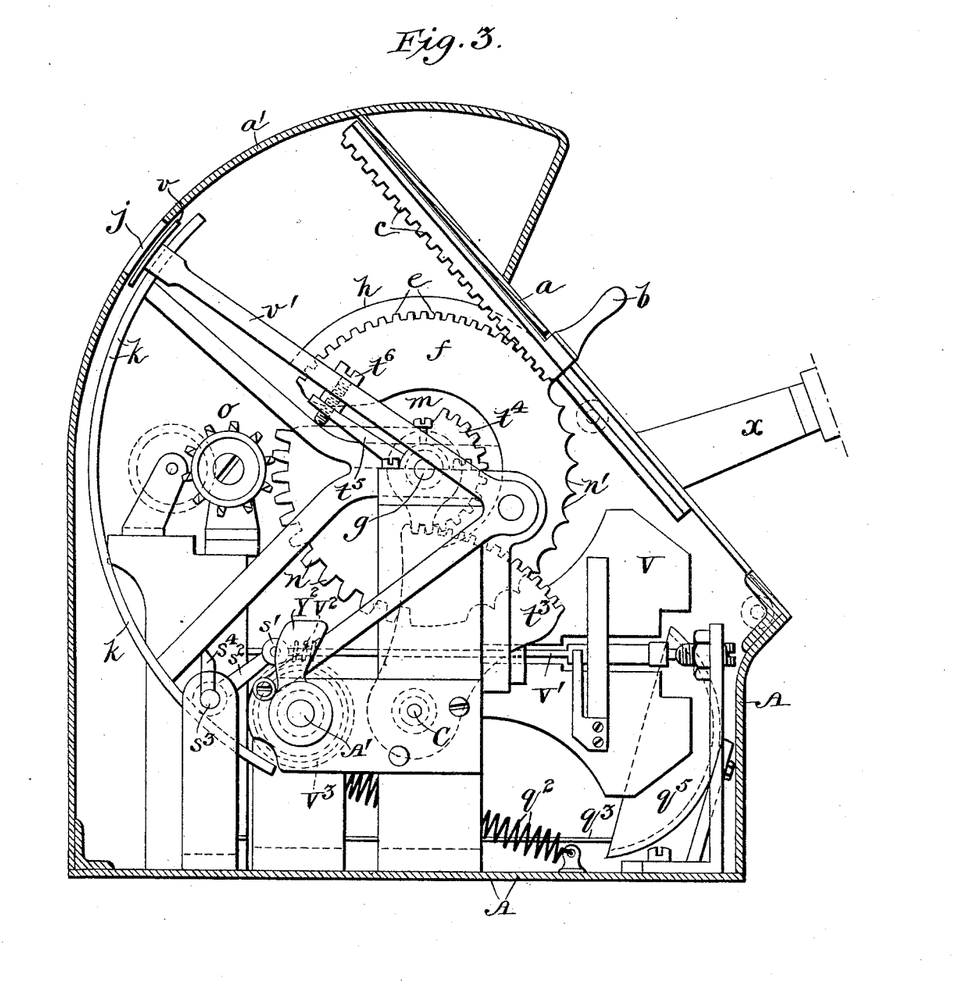
Figs. 3 and 4 represent two elevations taken at opposite ends of the registering mechanism, the casing being sectioned vertically.
Figures 10, 12:
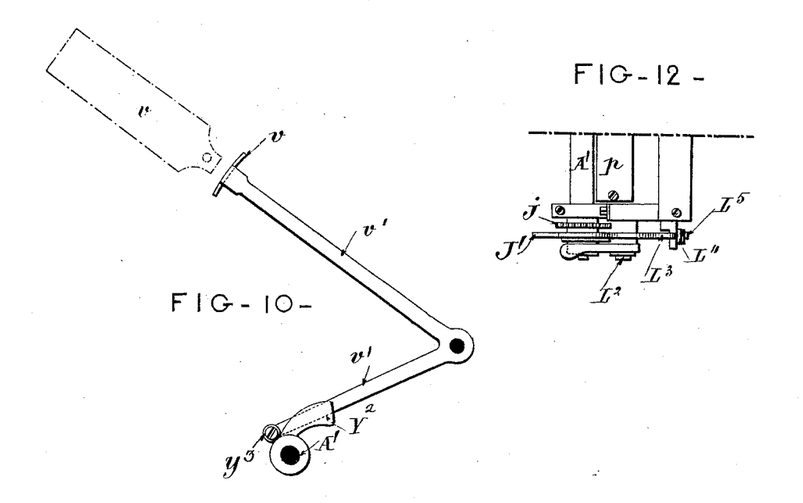

The cam $Y^2$, Figs. 3 and 10, acts on a trundle-roller on one arm of a lever $v'$, and thereby shifts a shutter $v$, which is carried by the other arm of said lever, away from the window $j$ on the customer's side to open the same, but allows it to fall into its closing position when there is no longer need to inspect the figures on the disks $k$ through the said window.

The cam S acts on a trundle-roller $s'$ on an arm $s^2$ of a small shaft $s^3$, which shaft carries also arms $s^4$, equal in number to the registering-segments $k$ and arranged for contact, respectively, with the lower spokes of the said segments. These arms $s^4$ are short and merely serve to replace any one of the said segments and the connected disk $f$ in accurate position in case by reason of some slip of the teeth of the disk and rack the said segment and disk have accidentally moved too far.

The worm-wheel $V^3$ gears with a worm $V^2$, fast on a shaft $V'$, turning in fixed bearings, and thereby keeps a wing-regulator $V$, also fast on said shaft, continuously in rotary motion whenever the driving-shaft rotates.

The cam $P^2$ is for the purpose of throwing the series of pinions $o$, before referred to, into and out of gear with the teeth $n$ of registering-disks $f$. To this end the said cam acts on an arm $P'$, Fig. 13, of a rock-shaft P, which is provided with radial arms $p'$, serving as supports for a bar $p$, on which bearing-blocks are formed in pairs for the short shafts or axial rods O of the said pinions $o$, one small shaft to each pinion. A spring $P^3$ holds the arm $P'$ in contact with the cam $P^2$, and also operates, when the said cam passes from under it, to turn back the said rock-shaft and replace the bar $p$ and devices carried thereby in their first position. By the alternate action of the said cam and the said spring the said pinions are moved collectively first into one and then into the other of their extreme positions of oscillation. In one of these positions they gear with the teeth $n$ of the disks $f$. In the other they gear with a series of stud-wheels or lantern-wheels $t$, turning with short shafts $t^8$, one shaft to each wheel $t$, journaled in fixed bearing-blocks $t^7$, arranged in pairs. Only the first pinion $o$, which gears when in one position with the disk $f$, representing the denominational units of currency, such as cents or centimes, does not gear with any wheel $t$ when in its other position. There is also a pinion $o^4$ in continuation of the series $o$ at the other end of the said series, which gears with the last of the lantern-wheels $t$ when shifted into one position of vibration, but does not gear with any disk $f$ when in the other position. Thus the series of pinions exceed by one the series of disks $f$ and the series of wheels $t$; but as considered with regard to these two series the inactive pinion in the one case is at the opposite end of the series from the inactive pinion on the other.

Figure 1:
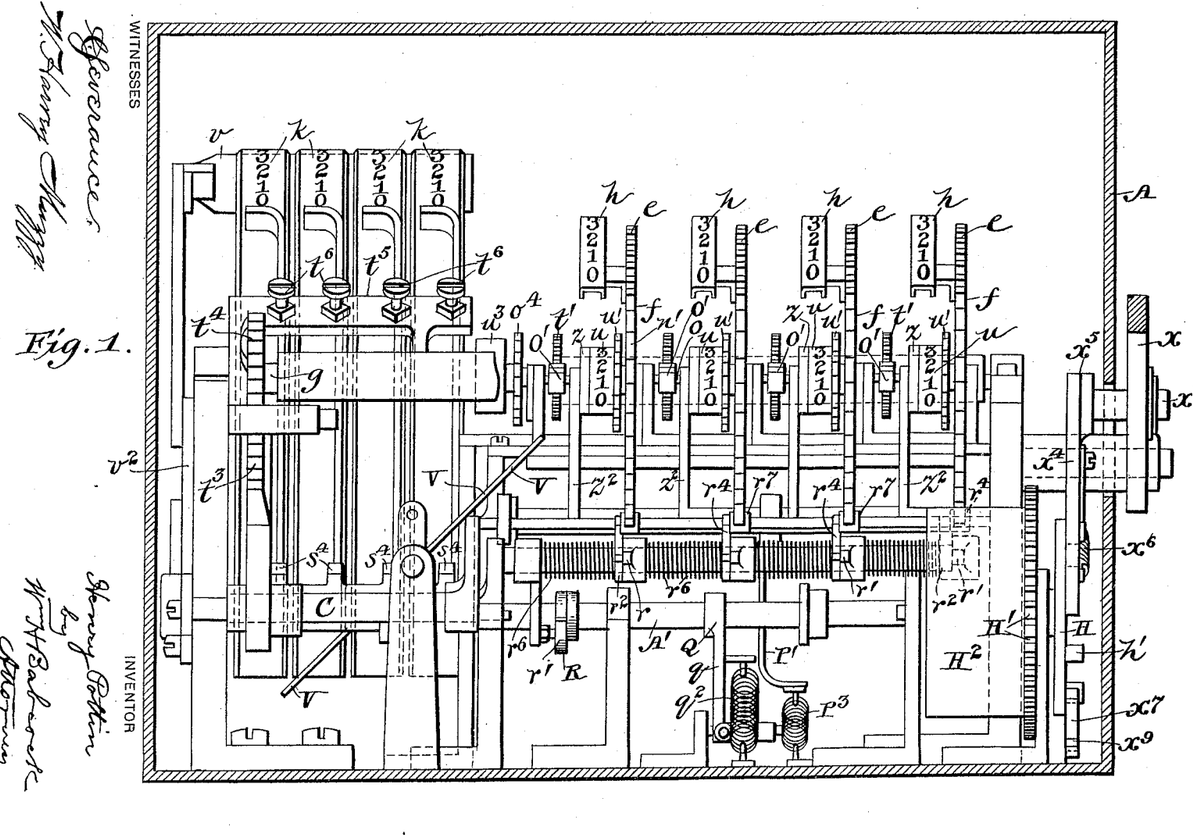
Figure 1 represents an elevation of the apparatus, taken from the cashier's side, the key-racks being removed and the casing being vertically sectioned to show the mechanism within.
Figure 2:
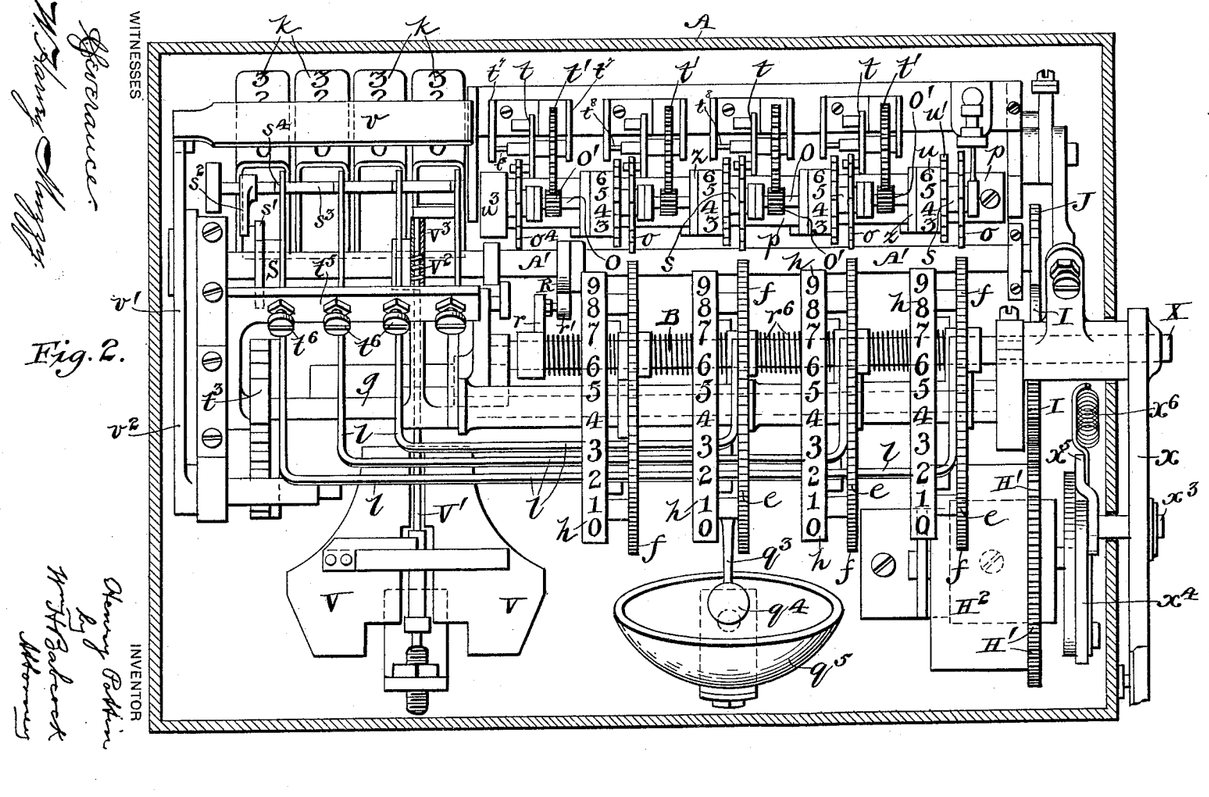
Figure 18:
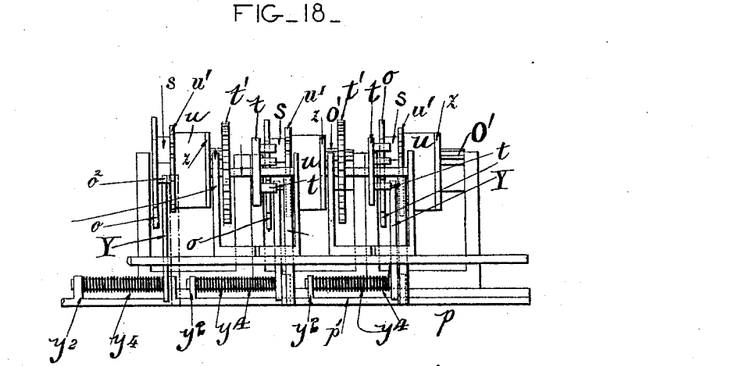
Figure 20:
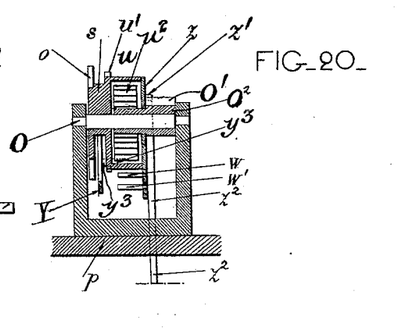

Each pinion $o$ is integral with a cam $s$ and a spring-drum $u$, the latter being provided with an external ratchet-wheel $u'$, Figs. 2, 18, and 20. The inclosed coiled spring $u^2$ of each drum $u$ is attached at the outer end to the said drum and at the inner end to a sleeve or hub $O^2$, loose on the said fixed rod or shaft O and extending within the said drum, as shown in Fig. 20. This sleeve or hub carries a disk or plate $z$, which closes the end of the said drum, also a toothed segment $O'$ beyond the said disk. The disk or plate $z$ extends at one point beyond the periphery of the said drum and is there provided with two lateral studs or rods $w$ $w'$, extending laterally across the front of the said drum, but at different distances from the center of the said disk. The latter is also provided on the other side and at the opposite point of its diameter with a lug or contact-piece $z'$, Figs. 13, 15, and 20. The peripheries of the drums $u$ are graduated to correspond to the segments $h$ and $k$. The ratchet-wheels $u'$ are respectively engaged by retaining-pawls $y$, fastened on blocks $y'$ of bar $p$. The construction of each group of devices accompanying each wheel $o$ on its rod or shaft O is the same; but the drum $u$, integral with supplemental pinion $o^4$, has no spring, and there is no cam $s$ on its shaft O.

Figure 19:
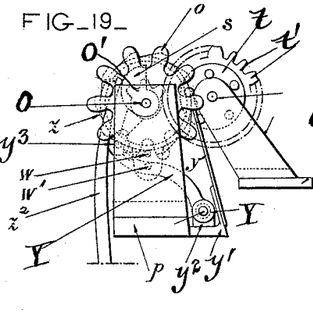

The blocks $y'$ aforesaid are provided with pivot-pins $y^2$, one to each, for the bent arms Y, each of which has a lateral projection $y^3$, Figs. 19 and 20. Helical springs $y^4$ on the aforesaid pivot-pins $y^2$ hold the arms Y respectively against the cams $s$, which are integral with the pinions $o$. Each arm or lever Y is normally in position to lock the disk or plate $z$ and segment $O'$ by the contact of its projection $y^3$ with the inner stud $w$ of the said disk.

When any rack in the act of registering a payment is caused to turn its registering-disk $f$, the cam $s$ on the same shaft with the latter is turned thereby to the same extent. This cam bears against the corresponding lever Y and presses the latter outward, so as to remove the projection $y^3$ of this lever from the path of the inner stud $w$, or, if the payment and consequent movement of the rack-registering disk and cam $s$ be great enough, out of the paths of the stud $w$ and the stud $w'$ as well. This latter result will be attained whenever the aggregate movement of the disk $f$ in registering successive payments will turn the cam $s$ far enough to make it move the cam Y and projection $y^3$ into position to avoid both of the said studs. If the movement of the said cam is only sufficient to move the projection $y^3$ beyond the inner stud $w$, the latter is freed and the disk $z$ turns through a small part of its rotation, being stopped at the end of it by the contact of projection $y^3$ with the outer stud $w'$. When the movement of the disk $f$, in again registering payment, so far turns the cam $s$ that the projection $y^3$ is removed from contact with stud $w'$, as above stated, the disk $z$ is freed again and turns through the remainder of its rotation, being stopped at the end thereof by the contact of its lug $z'$ with lever $z^2$.

Figures 13, 14, 15, 16:
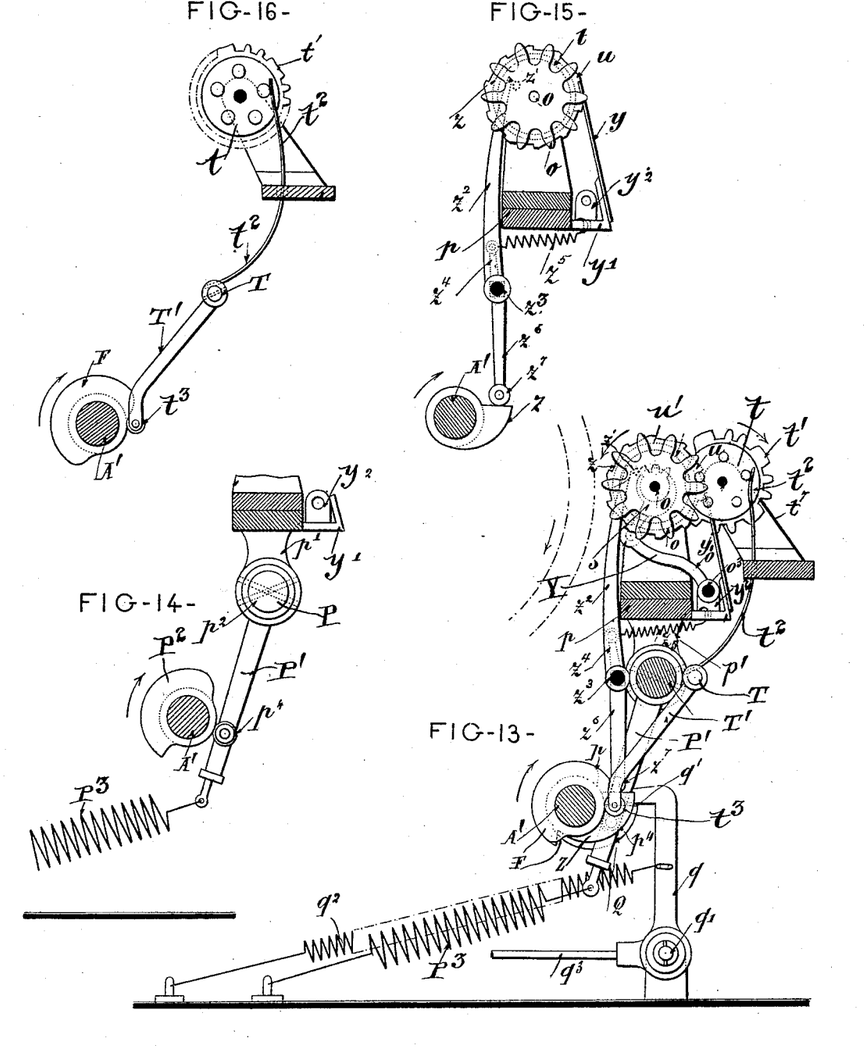

The lug or contact-piece $z'$ of each disk is arranged to be locked by the corresponding arm $z^2$ of a series thus marked, the same being fast on a shaft $z^3$, Figs. 13 and 15, which is journaled in fixed bearings and provided with two additional arms $z^4$ and $z^6$. The arm $z^4$ has a spring attached to it for holding the said arms $z^2$ against the contact-pieces or lugs $z'$ or drawing them into position for such contact. The arm $z^6$ carries an antifriction-roller $z^7$, which runs on a cam Z of the main shaft A' and is actuated by the said cam to remove the arms $z^2$ from such contact with lugs $z'$ and leave the said disks $z$ free.

Each lantern-wheel or stud-wheel $t$ has a gear-wheel $t'$ integral or rigid therewith and turning on the same axis. The periphery of each wheel $t'$ is provided with fifteen teeth, divided into groups of three teeth each, every such group being adapted to gear with one of the toothed segments O' when the rock-shaft P is turned, so as to shift the bar $p$ and series of rods or fixed shafts O to one of the two positions which are alternately occupied by the bar $p$ and shafts O, collectively considered. The spring $u^2$ of each drum $u$, integral with gear-wheel $u'$, is attached at its inner end to the hub or sleeve O³ and at its outer end to the said drum. Each oscillation of the said segments O' on their shafts O under the stress of the springs of drums $u$, when the disks $z$ are freed from the locking-arms Y and $z^2$, causes the corresponding gear-wheels $t'$ and lantern-wheels $t$ to make one-fifth of a rotation. Each lantern-wheel $t$ is in gear with the pinion $o$ one decimal place ahead of the segment O' which turns said wheel. During one part of the operation of the mechanism the said stud-wheels or lantern-wheels $t$ are locked by flat springs $t^2$, Figs. 13 and 16, which are carried by a shaft T, journaled in fixed bearings. The cam F on main shaft A' acts on an arm T' of shaft T through a terminal trundle-roller $t^3$ to move the said springs into such contact. Normally they do not press on the said lantern-wheels.

In describing the various parts of my machine the operation of nearly everything except the carrying mechanism has been sufficiently explained, but for the sake of greater clearness I will now set forth the entire operation in due order.

The cashier after each payment has three distinct manipulations to perform. First, he slides the keys $b$ along their slots to exhibit the amount of the payment through the windows $i$ $j$, as described. Secondly, he depresses the manipulating-lever $x$, winding the mainspring to some extent, partly for the purpose of locking the registering disks and segments in the position given them by the sliding of the said keys. This locking is effected by the rotation of the main shaft and cam R under the impulse of the said spring and the consequent operation of arm $r$, shaft B, arms $r^2$, and levers $r^4$, whereby the rollers $r^7$ are forced into locking engagement with the teeth $n'$, as before described. Thirdly, he raises the manipulating-lever $x$ and thereby winds the said mainspring still more, its expansion then serving to replace the said registering devices in their former position ready for another act of registry to ring the bell and move the shutter over the window.

It is unnecessary to repeat the action of the pawls $x^4$ and $x^5$, lantern-wheel H, the lever L, spur L⁴, the forked arm, disk J', mainspring-drum H², and connecting-gears for driving the main shaft. The depression of the said manipulating-lever puts the spring of said drum under all the tension that is necessary to drive the mechanism until the stud $j'$ stops it by contact with the vertical arm of lever L. The cam F causes the arm T' to press the springs $t^2$ on the wheels $t$ and hold them motionless. The cam P² rocks the shaft P through arm P', so as to shift the pinions $o$ from the lantern-wheels $t$ into gear with the teeth $n$ of the disks $f$. The cam R rocks the shaft B, as aforesaid, and by means of the described intervening devices forces the rollers $r^7$ into engagement with the teeth $n'$ of disk $f$, so as to lock the registering mechanism in the position given it by the keys and rack-bars. The cam Y simultaneously removes the shutter $v$ from the window $j$. During the above operations, caused by the depression of the actuating-lever and the consequent rotation of cams F, P², R, and Y, the cams Q, S, T³, and Z turn without producing any effect.

The winged regulator V at all times keeps the action of the mechanism even and regular.

When the cashier raises the manipulating-lever $x$ from the lowest to the highest point, the forked arm moves the lever L to free the disk J', which is caused by the spring-drum H² to turn until the other stud of the said disk comes in contact with the said lever, that is to say, through the greater part of a complete rotation. The said lever is provided with a lug for such contact, as indicated by dotted lines. The cam F, turning with the shaft A', again holds the lantern-wheel $t$ motionless. The cam Q begins to raise the bell-hammer for action. The cam $T^3$ returns the registering mechanism, as before described, to its first position, the cam R simultaneously releasing the disks $f$ by ceasing to act on the roller carried by arm $r$, thereby allowing the rollers $r^7$ to fall out of locking engagement with the teeth $n'$ of the said disks. The rotation of said disks has already turned correspondingly the respective pinions $o$, these being equal thereto in the number (ten) of their teeth, and of course thereby has turned also the graduated drums $u$ each to the same extent as its pinion. The returning action of cam $T^3$ and the devices actuated thereby of course affects only the registering-disks $f$ and segments $h$ and $k$. The pinions $o$ and drums $u$ retain the positions to which they have been turned, so that successive payments may be added to the amount indicated already on the said drums, as hereinafter explained.

During the rotation of each pinion $o$ and its drum $u$ by the corresponding toothed disk $f$ the spring $u^2$ is wound thereby and would turn the disk $z$ and three-toothed segment $O'$, which are on the same shaft with the said pinion and drum, but for the locking of the said segment by the lever Y, as explained. When the cam $s$, acting on said lever Y, disengages its lateral projection $y^3$ from the inner stud $w$ of the said disk $z$, the latter will turn under the impulse of the said spring until stopped by the contact of the said projection with the outer stud $w'$ of the said disk $z$. If the said cam $s$ has been turned far enough to make the said projection avoid the inner stud $w$, as well as the outer one $w'$, the disk $z$ will turn until it makes a complete rotation, when it is stopped by the contact of arm $z^2$ with lug $z'$. Whether the disk $z$ will turn through the distance corresponding to the interval between studs $w$ and $w'$, as first above described, or through a complete rotation until stopped by arm $z^2$ will depend in any particular operation on the total of the sums added on the said drum. If this be great enough to call for carrying to the next decimal place, the entire rotation will be made. The effect of this is to put the three-toothed segment $O'$, which turns with the disk $z$, in position to engage one of the five sets of three teeth of the wheel $t'$, which turns the five-stud lantern-wheel $t$, meshing with the pinion $o$ of the next higher decimal place. The cam $P^2$ then releases the rock-shaft P, and the counteracting spring acts on the latter to shift the pinions $o$ (except the first one) into gear with the lantern-wheels $O'$, respectively. During this movement the said pinions and their drums are held from turning back under the expansive action of springs $u^2$ only by the engagement of the ratchets $u'$ with the retaining-pawls. Simultaneously with this shifting the cam $P^2$, arm $T'$, and intervening devices release the lantern-wheel $t$ and the wheel $t'$, carrying the five series of three teeth each. The cam Z then withdraws the arms $z^2$ from position for contact with the lugs $z'$ of said disks $z$, leaving all of said disks free to turn under the impulse of springs $u^2$, except those disks which, as aforesaid, have not yet been released by the levers Y—that is, the disks $z$ (and those only) are free to turn farther which are needed to take part in the arithmetical operation of carrying; but they cannot turn beyond a single complete rotation, for the arms $z^2$ are again interposed by the action of cam Z, a little before such rotation is ended, in position for contact with said lugs $z'$ and to lock the said disks. The first pinion $o$ is not in engagement with any wheel $t$, because there is never any need to carry in the units place. The last pinion $o'$ has no spring nor disk $z$, because there is no indicating device to which "1" may be carried therefrom. If five cents be first received, the first key and rack are moved far enough to turn the disk $f$ which is first in series through a distance of five teeth, exhibiting the numeral "5" on the segments $h$ and $k$ and the drum $u$ belonging to the units place. The shafts O are then vibrated from one position to the other without effect, the registering mechanism being meanwhile returned to its former position ready for another act of registry, but without affecting the position or indications of the totalizing devices $o$ and $u$. If now another payment of three cents be made, the operation, *pro tanto*, will be repeated, and after the registering-disks $f$ and segments $h$ and $k$ are replaced in their first positions the numeral "8" will be presented by the units-indicators $h$, $k$, and $u$. If the next payment be four, making a total of twelve cents, the units-pinion $o$ and drum $u$ will turn through four places, exhibiting the numeral "2" and leaving "1" to carry to the tens place. This carrying is automatically effected as follows: The three-toothed segment $O'$, which is connected through its hub to the spring $u^2$ of the said drum, being in engagement with one of the sets of teeth of the wheel $t'$, and the corresponding disk $z$ being forced from the levers Y and $z^2$, as aforesaid, the spring $u^2$ of the said drum gives a complete rotation to said disk and said segment, thereby turning the wheels $t'$ and $t$ through one-fifth of a rotation, which is transmitted as a one-tenth movement by one of the studs or rods of the said wheel $t$ to the pinion $o$ of the tens place, turning it forward one tooth and presenting the numeral "1" of the corresponding drum $u$. This, with the two exhibited by the units-wheel, will make up the twelve required.

The carrying from tens to hundreds and so on through all the decimal series will be done in the same way. Of course large sums may be added as well as small ones, but for convenience and conciseness of explanation a simple instance of small successive payments has been chosen.

After each payment is registered the hammer strikes the bell and, with short interval for inspection, the shutter covers window *j*.

Having thus described my invention, what I claim as new, and desire to secure by Letters Patent, is—

1. In a cash-register, the combination of the manipulating-lever and a two-forked arm carried thereby with a pair of pawls pivoted to said lever, a wheel provided with studs arranged to be acted on by the said pawls as shown, a spring-drum for actuating the main shaft, gearing between the said wheel and the said drum, and locking mechanism for the said main shaft arranged to be struck and released by the said two-forked arm at each upward and downward movement of the said manipulating-lever, the arrangement and construction of the said pawls being such that they engage the said studs alternately but always turn the said wheel in the same direction substantially as set forth.

2. In a cash-register, the combination of the manipulating-lever and means connected therewith for winding the driving-spring whether the said lever moves up or down, with a disk carried by the driving-shaft and having two studs or projections arranged one behind the other in the direction of rotation and at unequal distances from the center, a stop-lever in the path of one or the other of these studs as they rotate, an attachment of the manipulating-lever arranged to shift the said stop-lever from one of said positions to the other as the said manipulating-lever moves up or down, and a locking device for said stop-lever which will hold it in either of said positions against accidental displacement, but will yield to allow such shifting substantially as set forth.

3. In a cash-register, the combination of the manipulating-lever and means actuated thereby for winding the mainspring, a disk carried by the main shaft driven by said spring and provided with two studs arranged one behind the other in the direction of rotation and at different distances from the center, a stop-lever L arranged to occupy one of two positions alternately and engaging therein one or the other of the said studs to lock the said main shaft, the said stop-lever being further provided with a doubly-notched supplemental arm, a spring-pressed spur engaging one or the other of the said notches according to position, and a two-forked arm carried by the manipulating-lever and arranged to strike the said stop-lever with one arm as it descends and with the other as it rises thereby shifting said stop-lever from one position to another substantially as set forth.

4. In a cash-register, the combination of a spring-driven main shaft with means for stopping it at two different points of its rotation, and devices for successively freeing it from such obstructions substantially as set forth.

5. In a cash-register a spring-driven main shaft and a disk carried thereby, provided with two studs or lugs at different distances from its center, in combination with a movable detent arranged to engage one or the other of the said studs according to its position, a spring-catch arranged to lock said detent in either of its positions of engagement but adapted to yield under pressure, and means for overcoming the resistance of the catch and moving the said detent from one position to the other, thereby allowing the main shaft to turn for a partial rotation under the impulse of its spring substantially as set forth.

6. In a cash-register, the disks *f* provided with two sets of teeth *e* and *n*, in combination with the sliding key-racks engaging the former teeth, pinions or gear-wheels engaging the latter teeth and driven thereby, totalizing-indicators turning with the said pinions, mechanism for shifting the said pinions and indicators from the position of such engagement to another position, gearing arranged to engage with the said pinions in this latter position and carrying mechanism coöperating with said gearing and pinions for the purpose set forth.

7. In a cash-register, the disks *f* provided with two sets of teeth *e* and *n*, in combination with actuating devices engaging the former teeth, pinions gearing with the latter teeth, a rock-shaft which carries the bearings of the shafts or axial rods on which the said pinions turn, the main shaft of the machine and means operated thereby for oscillating the said rock-shaft so as to throw the said pinions alternately into and out of gear with the teeth *e*, coiled springs wound by the turning of the said pinions, segments attached to these said springs and driven thereby additional gearing making connection between the segment of one decimal place and the pinion of the next higher when the pinions are shifted away from disks *f*, automatic locking devices for said segments and said gearing and means for automatically freeing the same, the arrangement and construction of the said parts and the teeth of the respective gears being calculated for the operation of carrying substantially as set forth.

8. In a cash-register, a series of totalizing-indicators devices for turning them forward as described, means for retaining them against turning backward, a series of coiled springs each of which is connected at one end to one of said indicators and at the other end to a rotary gear, means for automatically locking the said gear and permitting its rotation as needed, a series of gear-wheels arranged in pairs in stationary position the wheels of each pair being in mesh respectively with one of the spring-actuated gears aforesaid and with a pinion turning with the next higher indicators as part of their aforesaid actuating mechanism and means automatically actuated for holding each pair of said wheels against rotation until the above-described engagement takes place.

9. In the totalizing devices of a cash-register the series of parts mounted to turn on a rod or shaft O consisting of a pinion $o$, indicating-drum $u$, ratchet-wheel $u'$ and cam $s$, all integral, a toothed segment O', a disk $z$ turning with said segment and having studs $w\,w'$ on one side unequally distant from the center and lug $z'$ on the other side and a coiled spring attached at one end to said drum and at the other to a part turning with the said disk and segment, in combination with means for turning forward the said pinion, cam, ratchet and drum, a stop-lever moved by said cam out of position for locking the outer stud $w'$ or out of position for locking either stud according to the degree of rotation of the indicating-drum and the said cam, another stop-lever which engages the lug $z'$ to lock said disk at the end of a complete rotation, means for automatically freeing the latter stop-lever from such engagement, the wheels $t\,t'$ turning together one engaging the said segment and the other engaging the pinion belonging to the next denominational or decimal place, means for automatically locking these wheels and automatically freeing them for the described operation, and mechanism for automatically shifting the said pinion and segment and all the similar devices of their series into and out of engagement with the said wheels $t\,t'$ substantially as set forth.

10. In a cash-register a series of gears forming part of the totalizing mechanism and arranged in pairs the members of each pair being connected by a coiled spring, in combination with registering and retaining mechanism operating to turn forward one of said gears after each indication of payment and hold it against returning, another series of gears also in pairs but having the members of each pair constructed to turn together, means for throwing into, and out of engagement the said gears, and means for automatically locking them against forward rotation and releasing them therefor as needed in the described operation of carrying, each pair of gears of the latter series connecting a gear at the actuating end of the spring in the first series with the gear at the winding end of the next spring corresponding to the next higher decimal or denominational place.

11. In a cash-indicator, the disks $f$ each having three sets of teeth $e$, $n$ and $n'$ arranged on different parts of its periphery, in combination with actuating-racks engaging teeth $e$, totalizing-wheels engaged and driven, teeth $n$, and a locking-roller forced in between the teeth $n'$ by the driving-shaft, a cam on the said main shaft and an intermediate shaft and arms actuated by the said cam to move the said roller into locking position substantially as described.

12. In a cash-register, the combination with the registering-disks and indicating-segments $k$ of automatic mechanism for returning the same to their normal position, the said mechanism consisting of a cam on the driving-shaft, a lever actuated thereby, and arms thrown by said lever into contact with the said indicating-segments substantially as set forth.

13. In combination with the registering disks and segments, mechanism for returning them to their normal position, consisting of a cam on the driving-shaft, a lever actuated by said cam, arms actuated by said lever for turning back the several segments, and adjusting devices attached to the said arms for regulating their action on the said segments substantially as set forth.

14. In combination with the indicating-segments $k$ the devices for returning them to their first position consisting of a cam $T^3$ on the main shaft a lever acted on thereby, a toothed segment turning with the said lever, a second segment gearing with the first and mounted loosely on the shaft of the registering devices and an arm turning with the second segment and provided with attachments for pressing on the arms or spokes of said segments substantially as set forth.

15. In combination with the registering mechanism including the segments $k$, the cam S rotated by the main shaft an arm $s^2$ actuated by said cam, a shaft $s^3$ turning with said arm and a series of arms $s^4$ mounted on said shaft and moving therewith against the arms or spokes of the said segments to correct the results of slipping substantially as set forth.

16. A series of disks $f$ each provided with three sets of teeth and forming part of registering mechanism, in combination with sliding racks that engage one of the said sets of teeth and are provided with handles or opering-keys, a series of pinions $o$ arranged to be thrown into or out of connection with a second set of these teeth, a series of rollers arranged to be thrown into locking engagement with the third set of teeth, a main shaft its cams and intermediate devices for actuating the aforesaid parts substantially as set forth.

In witness whereof I have hereunto set my hand in presence of two witnesses.

HENRY POTTIN.

Witnesses:
EUGÉNE WATTIER,
CLYDE SHROPSHIRE.